(12) United States Patent  (10) Patent No.: US 9,276,259 B2
Chang et al.  (45) Date of Patent: Mar. 1, 2016

(54) SECONDARY BATTERY OF IMPROVED LITHIUM ION MOBILITY AND CELL CAPACITY

(71) Applicant: LG Chem, Ltd., Seoul (KR)

(72) Inventors: Sung Kyun Chang, Daejeon (KR); Seo-Jae Lee, Daejeon (KR); Sanghoon Choy, Daejeon (KR); Euiyong Bang, Chungcheongbuk-do (KR); Minchul Jang, Daejeon (KR); Ki-Young Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/228,879

(22) Filed: Mar. 28, 2014

(65) Prior Publication Data

US 2014/0242464 A1  Aug. 28, 2014

Related U.S. Application Data

(63) Continuation of application No. 11/359,139, filed on Feb. 22, 2006.

(30) Foreign Application Priority Data

Feb. 25, 2005  (KR) .................. 10-2005-0015172

(51) Int. Cl.
 *H01M 4/02* (2006.01)
 *H01M 4/36* (2006.01)
 (Continued)

(52) U.S. Cl.
 CPC .............. *H01M 4/364* (2013.01); *H01M 4/485* (2013.01); *H01M 4/505* (2013.01); *H01M 4/525* (2013.01); *H01M 10/0525* (2013.01); *H01M 4/131* (2013.01); *H01M 2004/021* (2013.01); *H01M 2004/028* (2013.01); *Y02E 60/122* (2013.01)

(58) Field of Classification Search
 None
 See application file for complete search history.

(56) References Cited

U.S. PATENT DOCUMENTS 6,248,477 B1  6/2001 Howard, Jr. et al.
6,534,216 B1  3/2003 Narukawa et al.
(Continued)

FOREIGN PATENT DOCUMENTS

EP  1022792 A1  7/2000
EP  1465271 A1  10/2004
(Continued)

OTHER PUBLICATIONS

Deng B et al: "Comparison and improvement of the high rate performance of different types 01 LiMn2O4 spinels", Journal of Power Sources, Elsevier SA, CH, vol. 141, No. 1, Feb. 16, 2005, pp. 116-121.

(Continued)

*Primary Examiner* — Maria J Laios
(74) *Attorney, Agent, or Firm* — Lerner, David, Littenberg, Krumholz & Mentlik, LLP

(57) ABSTRACT

Provided is a lithium secondary battery having improved discharge characteristics in a range of high-rate discharge while minimizing a dead volume and at the same time, having increased cell capacity via increased electrode density and electrode loading amounts, by inclusion of two or more active materials having different redox levels so as to exert superior discharge characteristics in the range of high-rate discharge via sequential action of cathode active materials in a discharge process, and preferably having different particle diameters.

6 Claims, 9 Drawing Sheets

(51) Int. Cl.
  *H01M 4/505* (2010.01)
  *H01M 4/525* (2010.01)
  *H01M 10/0525* (2010.01)
  *H01M 4/485* (2010.01)
  *H01M 4/131* (2010.01)

(56) References Cited

U.S. PATENT DOCUMENTS

| | | | |
|---|---|---|---|
| 6,682,850 | B1 | 1/2004 | Numata et al. |
| 6,818,351 | B2 | 11/2004 | Sunagawa et al. |
| 2002/0061443 | A1* | 5/2002 | Nakanishi et al. ............ 429/223 |
| 2002/0164528 | A1 | 11/2002 | Sunagawa et al. |
| 2003/0138699 | A1 | 7/2003 | Kweon et al. |
| 2004/0023117 | A1 | 2/2004 | Imachi et al. |
| 2005/0233217 | A1 | 10/2005 | Fujihara et al. |
| 2006/0257745 | A1 | 11/2006 | Choi et al. |
| 2007/0196736 | A1 | 8/2007 | Takahashi et al. |

FOREIGN PATENT DOCUMENTS

| | | |
|---|---|---|
| EP | 1508934 A1 | 2/2005 |
| JP | H06-275273 A | 9/1994 |
| JP | H10-208730 A | 8/1998 |
| JP | 11086845 | 3/1999 |
| JP | 11162466 | 6/1999 |
| JP | 2000082466 A | 3/2000 |
| JP | 2000195513 A | 7/2000 |
| JP | 2000215884 A | 8/2000 |
| JP | 2001148249 A | 5/2001 |
| JP | 2001297762 A | 10/2001 |
| JP | 2001351626 A | 12/2001 |
| JP | 2003077459 A | 3/2003 |
| JP | 2003-123738 A | 4/2003 |
| JP | 2003-229128 A | 8/2003 |
| JP | 2003-272623 A | 9/2003 |
| JP | 2003-272705 A | 9/2003 |
| JP | 2003-346798 A | 12/2003 |
| JP | 2004-063394 A | 2/2004 |
| JP | 2005-019149 A | 1/2005 |
| JP | 2005-190786 A | 7/2005 |
| JP | 2005-317499 A | 11/2005 |
| JP | 2006-228733 A | 8/2006 |
| KR | 20030063930 A | 7/2003 |
| WO | 9701191 A2 | 1/1997 |
| WO | 2004030122 A1 | 4/2004 |
| WO | 2004040676 A1 | 5/2004 |

OTHER PUBLICATIONS

Fergus et al: "Recent developments in cathode materials for lithium ion batteries", Journal of Power Sources, Elsevier SA, CH, vol. 195, No. 4, Feb. 15, 2010, pp. 939-954.

Machine translation of JP 2000-082466 (Mar. 2000).

Shaju et al., Performance of Layered Li (Ni1/3Co1/3Mn1/3)O2 as Cathode for Li-ion Batteries, Electrochimica Acta, 48, 2002, pp. 145-151.

"Lithium Secondary Battery Having High Density," supervised by Takehara Zen-ichiro, Techno Systems, Inc., Mar. 14, 1998, Issue 1, pp. 61-67. (English translation of Introduction only.).

* cited by examiner

*Prior Art*

Ratio of discharge capacity at the respective
C-rates relative to 0.2C discharge capacity Ratio of discharge capacity at the respective
C-rates relative to 0.2C discharge capacity Ratio of discharge capacity at the respective
C-rates relative to 0.2C discharge capacity Ratio of discharge capacity at the respective C-rates relative to 0.2C discharge capacity

SECONDARY BATTERY OF IMPROVED LITHIUM ION MOBILITY AND CELL CAPACITY

CROSS-REFERENCE TO RELATED APPLICATIONS

The present application is a continuation of U.S. patent application Ser. No. 11/359,139, filed Feb. 22, 2006, which claims priority from Korean Application No. 10-2005-0015172, filed Feb. 25, 2005, the disclosures of which are hereby incorporated herein by reference.

FIELD OF THE INVENTION

The present invention relates to a secondary battery with improved lithium ion mobility characteristics and increased cell capacity. More specifically, the present invention relates to a secondary battery having improved discharge characteristics in a range of high-rate discharge without degradation of general characteristics of the battery, by fabricating a cathode using two or more active materials having different oxidation-reduction (hereinafter, simply referred to as "redox") levels so as to exert superior discharge characteristics in the range of high-rate discharge via sequential action of cathode active materials in a discharge process, and having maximized cell capacity via increased electrode density and loading amounts.

BACKGROUND OF THE INVENTION

With recent development of mobile communication and the Information-Electronic Industry, higher capacity, smaller and lighter lithium secondary batteries are increasingly in demand. However, with diversification of functions of the portable or mobile electronic equipment, which is thereby concomitantly accompanied by increased energy consumption of the equipment, there is also a strong need for realization of higher power and capacity of the batteries. Therefore, a great deal of research and study has been widely conducted to increase C-rate characteristics and capacity of the battery cells.

However, there is the presence of reciprocal relationship between C-rate characteristics and capacity of the battery cell. That is, when a loading amount or electrode density of the cell is increased in order to improve cell capacity, this attempt usually results in deterioration of C-rate characteristics of the battery cell.

Upon taking into consideration ionic conductivity of active materials, lithium secondary batteries, as shown in FIG. 1, are needed to maintain the electrode porosity over a predetermined level. Whereas, if the electrode is rolled at a high-rolling reduction rate in order to achieve increased loading amount or electrode density, the electrode porosity is excessively decreased, as shown in FIG. 2, which in turn leads to a rapid decrease in the C-rate. Further, when the same active materials having different particle diameters are used as an electrode active material, it is possible to accomplish a high electrode density by moderate rolling, but the electrode porosity is strikingly decreased as shown in FIG. 3, thereby leading to significant decreases in the C rate.

Therefore, although it is important to maintain appropriate porosity in order to meet a proper level of C rate characteristics, the thus-maintained void remains as a dead volume where the electrode is free of the active materials.

Secondary batteries must maintain a given level of C-rate suited for the corresponding uses thereof. In particular, secondary batteries for use in electrically-driven tools that require elevated power or secondary batteries for use in electric vehicles (EVs) and hybrid electric vehicles (HVs) require significantly higher C-rate. Consequently, in order to increase the battery power, there is a strong need for the development of a lithium secondary battery having improved C-rate characteristics in conjunction with maximized cell capacity.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have surprisingly discovered that, when a mixture of two or more active materials having a redox potential difference with given conditions is used as a cathode active material, it is possible to prepare a lithium secondary battery having improved discharge characteristics in a range of high-rate discharge while minimizing a dead volume as described hereinbefore, and at the same time, having increased cell capacity via increased electrode density and loading amounts. The present invention has been completed based on these findings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

In accordance with an aspect of the present invention, the above and other objects can be accomplished by the provision of a cathode active material for a lithium secondary battery, characterized in that the cathode active material is comprised of two or more active materials having different redox levels so as to exert superior discharge characteristics in a range of high-rate discharge by sequential action of cathode active materials in a discharge process.

As used herein, the term "redox level" refers to an electric potential of the plateau range in the discharge process or an electric potential at a discharge rate of approximately 50%. Preferably, the active materials in accordance with the present invention have the redox level in the range of 3.5 to 4.5 V. The difference of the redox level between active materials will also be referred to as "a redox potential difference"

As used herein, the phrase "sequential action of cathode active materials in a discharge process" means that a cathode active material having a relatively high redox level (hereinafter, referred to as a high-potential cathode active material) preferentially acts in the discharge process, followed by the action of a cathode active material having a relatively low redox level (hereinafter, referred to as low-potential cathode active material).

As used herein, the term "sequential action" means that relatively large amounts of the high-potential cathode active material preferentially act, but does not mean that action of low-potential cathode active material is initiated after all of the high-potential cathode active material has acted. Therefore, this term also encompasses the condition in which the low-potential cathode active material acts in the discharge process at a time point where a substantial amount, for example more than 50%, of the high-potential cathode active materials has acted in the discharge process.

In accordance with the present invention, when the cathode is formed of active materials having different redox levels, for example when the redox level of the active material A is 3.8 V and that of active material B is 4.0 V, the active material B does not undergo oxidation-reduction in an electric potential region of 3.8 V where oxidation-reduction of active material A takes place, and serves as an electrolyte carrier, i.e., a void. In contrast, active material A serves as a void in 4.0 V electric potential region where oxidation-reduction of active material B takes place. As a result, substantially higher porosity is attained in the redox level regions of each active material A and B whose oxidation-reduction occurs under the conditions in which the apparent porosity possessed by the electrode is generally the same.

Figure 1:
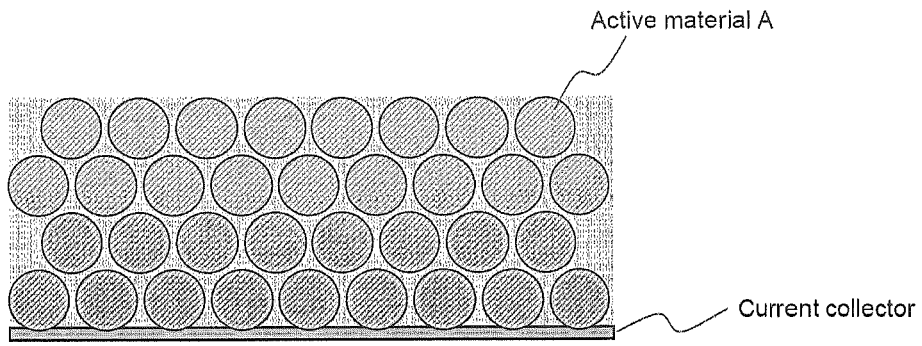
FIG. 1 is a schematic view of a cathode composed of one active material having the same particle diameter in accordance with a conventional art.
Figure 2:
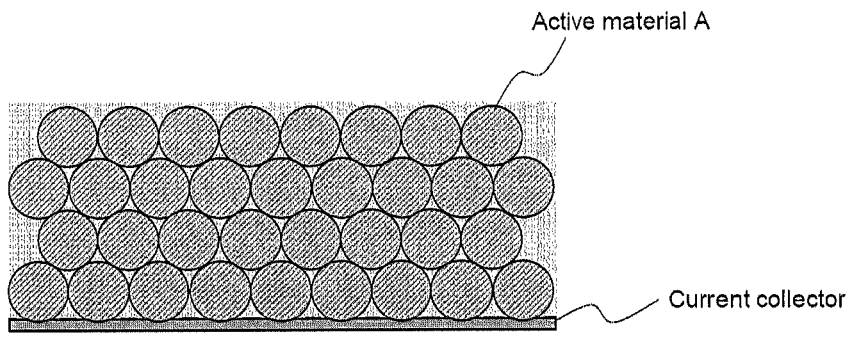
FIG. 2 is a schematic view showing a rolled active material of FIG. 1 at a high-rolling reduction rate.
Figure 3:
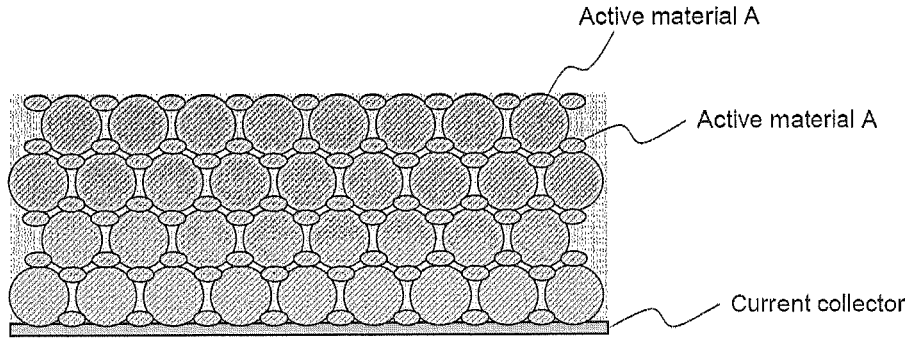
FIG. 3 is a schematic view of a cathode composed of one active material having a different particle diameter in accordance with a conventional art.
Figure 4:
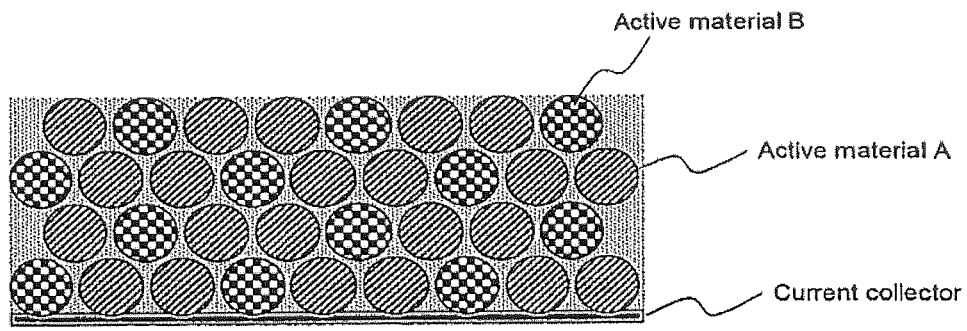
FIG. 4 is a schematic view of a cathode composed of two active materials having different redox potentials in accordance with one embodiment of the present invention.

The reason why such phenomena occur is because lithium (Li) ions should be smoothly supplied during oxidation-reduction of the active materials, while a higher C-rate leads to higher consumption of lithium (Li) ions for the same period of time. Therefore, when one active material is singly used and sufficient porosity is not secured due to increased rolling reduction rate of the active material, as shown in the above-described conventional art of FIG. 2, smooth supply of lithium ions is not effected and the higher C-rate leads to rapidly decreased capacity and service life of the electrode active material.

Figure 5:
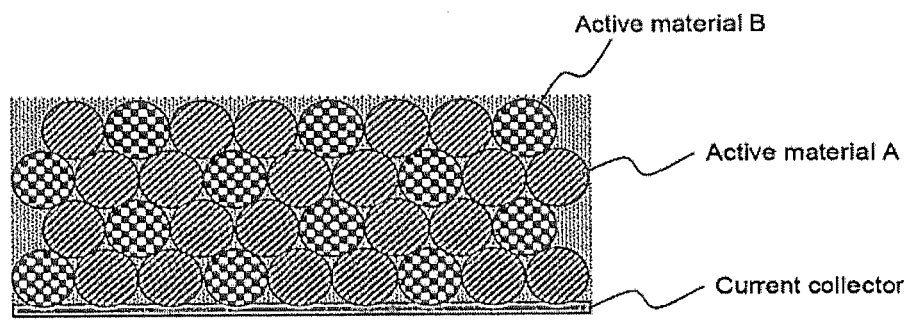
FIG. 5 is a schematic view showing rolled active materials of FIG. 4 with a high-rolling reduction rate.

In contrast, when the cathode is formed of two or more active materials having a predetermined redox potential difference according to the present invention, electrical conductivity of the electrode can be increased even when a rolling reduction rate is increased as shown in FIG. 5, and as will be described hereinafter, it is therefore possible to achieve increased cell capacity via improved C rate characteristics and increased electrode density.

The above-mentioned "range of high-rate discharge" may be affected by a variety of factors and for example, may be set to a range in which a significant decline of the discharge capacity occurs. Typically, such a discharge range may be flexibly determined depending upon supply state of an electrolyte inside the battery. As can be seen from Experimental Example 6 which will be described hereinafter, the discharge range may be set at a relatively low discharge rate in a battery having a full-cell structure in which supply of an electrolyte is limited.

Such discharge characteristics in the range of high-rate discharge will be often referred to hereinafter as "C-rate characteristics". As described hereinbefore, the cathode active materials in accordance with the present invention exert superior C-rate characteristics via sequential action of each active material. The phrase "superior C-rate characteristics" as used herein means that the actual C-rate values measured for mixed active materials are significantly large, as compared to calculated values (predicted values) with respect to a mixing ratio in mixed active materials, based on C-rate values measured independently for each active material. Such facts are results that were completely unpredictable prior to the present invention.

Therefore, even when the apparent porosity is lessened via high-rolling reduction rate so as to increase capacity, as shown in FIG. 5, the cathode active material in accordance with the present invention can exhibit superior C rate characteristics that were completely unpredictable before. Even though the redox potential differences of active materials, which exhibit sequential action as described above and consequently exert superior C rate characteristics, are not particularly defined as critical values, it was confirmed, as will be seen in Experimental Examples hereinafter, that desired results are not obtained when potential differences between active materials used in experiments are less than 0.03 V.

The different active materials in accordance with the present invention, i.e. heterogeneous active materials, may be selected from active materials represented by Formulae I through IV below. Different redo* levels are obtained depending upon kinds of transition metals contained in each active material, which are involved in oxidation-reduction, and oxidation numbers thereof. In addition, even when the same transition metals take part in oxidation-reduction, active materials may exhibit different redox levels, depending upon the composition and chemical structure thereof.

Specifically, the active materials that are used in the present invention may include active materials represented by Formulae I through IV below:

$$Li_{1+x}Co_{1-y}M_yO_2A_a \qquad \text{[Formula I]}$$

wherein, $-0.2<x<0.2;$ $0 \leq y \leq 0.2;$ $0 \leq a \leq 0.05;$

M is a first row transition metal such as Ni, Mn, Fe, Cr, Ti, Zn or V, Al, or Mg; and A is an element of Group 6A or Group 7A such as S, Se, F, Cl or I.

Materials of Formula I are active materials having electrochemical characteristics of $Co^{3+} \leftrightarrow Co^{4+}$ oxidation-reduction in layered structures thereof.

$$Li_{1+x}Ni_{1-y-z}M_yM'_zO_2A_a \quad \text{[Formula II]}$$

wherein, $-0.2 < x < 0.2;$ $0 \leq y \leq 0.2;$ $0 \leq z \leq 0.2;$ $0 \leq a \leq 0.05;$ each M and M' is independently a first row transition metal such as Co, Mn, Fe, Cr, Ti, Zn or V, Al, or Mg; and A is an element of Group 6A or Group 7A such as S, Se, F, Cl or I.

Materials of Formula II are active materials having electrochemical characteristics of $Ni^{3+} \leftrightarrow Ni^{4+}$ oxidation-reduction in layered structures thereof.

$$Li_{1+x}Ni_{1-y-z}M_yM'_zO_2A_a \quad \text{[Formula III]}$$

wherein, $-0.2 < x < 0.2;$ $0 \leq y \leq 0.2;$ $0 \leq z \leq 0.2;$ $0 \leq a \leq 0.05;$ each M and M' is independently a first row transition metal such as Co, Mn, Fe, Cr, Ti, Zn or V, Al, or Mg; and A is an element of Group 6A or Group 7A such as S, Se, F, Cl or I.

Materials of Formula III are active materials having electrochemical characteristics of $Ni^{2+} \leftrightarrow Ni^{4+}$ oxidation-reduction in layered structures thereof.

$$Li_{1+x}Mn_{2-y}M_yO_4A_a \quad \text{[Formula IV]}$$

wherein, $-0.2 < x < 0.2;$ $0 \leq y \leq 0.4;$ $0 \leq a \leq 0.05;$

M is a first row transition metal such as Ni, Mn, Fe, Cr, Ti, Zn or V, Al, or Mg; and A is an element of Group 6A or Group 7A such as S, Se, F, Cl or I.

Materials of Formula IV are active materials having electrochemical characteristics of $Mn^{3+} \leftrightarrow Mn^{4+}$ oxidation-reduction in spinel structures thereof.

In one specific embodiment, electrodes including the cathode active materials in accordance with the present invention may be composed of two active materials selected from Formulae I through IV above. Specific examples may include the following combinations, and contents of either of active materials in combinations may be in the range of 15 to 50%, based on the total weight of the active materials.

Figure 6:
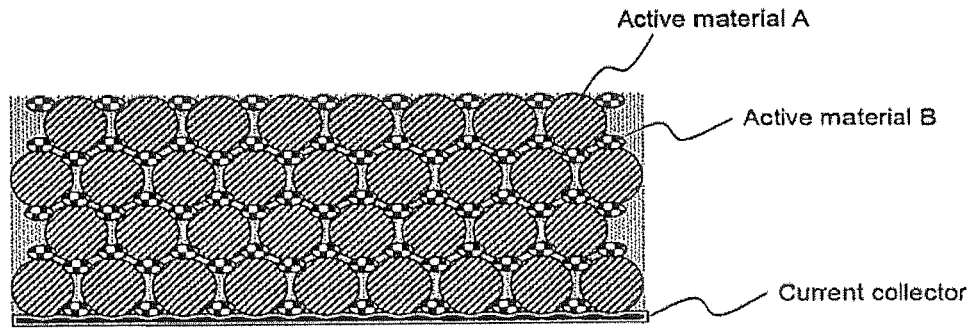
FIG. 6 is a schematic view of a cathode composed of two active materials having different particle diameters and redox potentials in accordance with another embodiment of the present invention.

Active material (A): $LiCoO_2$ Active material (B): $LiNi_{1/2}Mn_{1/3}Co_{1/3}O_2$ Active material (A): $LiCoO_2$ Active material (B): $LiNi_{0.7}Co_{0.25}Mn_{0.05}O_2$ Active material (A): $LiCoO_2$ Active material (B): $LiNi_{0.8}Co_{0.1}Mn_{0.1}O_2$ Active material (A): $LiCoO_2$ Active material (B): $LiMn_2O_4$ Active material (A): $LiMn_2O_4$ Active material (B): $LiN_{1/3}Mn_{1/3}Co_{1/3}O_2$ Active material (A): $LiMn_2O_4$ Active material (B): $LiNi_{0.7}Co_{0.25}Mn_{0.05}O_2$ Active material (A): $LiMn_2O_4$ Active material (B): $LiNi_{0.8}Co_{0.1}Mn_{0.1}O_2$ In particular, when the above active materials have different average particle diameters, it is possible to provide high-electrode densities and to increase loading amounts of electrodes. For example, from FIG. 6 schematically showing an electrode composed of active material A having a relatively large particle diameter and active material B having a relatively small particle diameter, it can be seen that it is possible to increase the electrode density and electrode loading amounts while maintaining inherently high porosity, from the viewpoint of characteristics in that the present invention uses heterogeneous active materials.

Regarding differences in average particle diameters between active materials, the size of active material B having a relatively small particle diameter may be less than 50%, preferably in the range of 10 to 35%, of that of active material A having a relatively large particle diameter, upon taking into consideration actual porosity and electrode density. From theoretical calculation on the assumption that all of the active materials are spherical, the particle diameter size of small-particle diameter active material B capable of being filled into empty spaces which are formed by large-particle diameter active material A, should be less than or equal to a product from a factor of 0.225× the particle diameter of large-particle diameter active material A. However, since active materials A and B generally are not of perfect spherical shapes, it is possible to achieve increased density even within the above-specified range. Absolute size differences may be preferably more than 10 μm.

Where the electrode is composed of two active materials, the content of active material B having a relatively small particle diameter may be preferably in the range of 15 to 50%, more preferably 20 to 35%, based on the total weight of the active material mixture (A+B). From experiments conducted by the present inventors, it was confirmed that addition of less than 15% content of small-particle diameter active material B exhibits essentially no addition effects or has insignificant effects on improvement of C rate characteristics. In contrast, when the content of small-particle diameter active material B is too high, it is difficult to accomplish improvement of the electrode density.

For example, two active materials having different average particle diameter to each other may be used by any combination of two or more active materials selected from Formulae I through IV. Examples of preferred combinations may include, but are not limited to, the following combinations. The particle diameter of active materials A is defined as being larger than that of active materials B.

Active material (A): $LiCoO_2$ Active material (B): $LiNi_{1/3}Mn_{1/3}Co_{1/3}O_2$ Active material (A): $LiNi_{1/3}Mn_{1/3}Co_{1/3}O_2$ Active material (B): $LiCoO_2$ Active material (A): $LiCoO_2$ Active material (B): $LiNi_{0.7}Co_{0.25}Mn_{0.05}O_2$ Active material (A): $LiNi_{0.8}Co_{0.15}Mn_{0.05}O_2$ Active material (B): $LiCoO_2$ Active material (A): $LiCoO_2$ Active material (B): $LiNi_{0.8}Co_{0.1}Mn_{0.1}O_2$ Active material (A): $LiNi_{0.8}Co_{0.1}Mn_{0.1}O_2$ Active material (B): $LiCoO_2$ Active material (A): $LiCoO_2$ Active material (B): $LiMn_2O_4$ Active material (A): $LiMn_2O_4$ Active material (B): $LiCoO_2$ Active material (A): $LiNi_{1/3}Mn_{1/3}Co_{1/3}O_2$ Active material (B): $LiMn_2O_4$ Active material (A): $LiMn_2O_4$ Active material (B): $LiNi_{1/3}Mn_{1/3}Co_{1/3}O_2$ Active material (A): $LiNi_{0.7}Co_{0.25}Mn_{0.05}O_2$ Active material (B): $LiMn_2O_4$ Active material (A): $LiMn_2O_4$ Active material (B): $LiNi_{0.7}Co_{0.25}Mn_{0.05}O_2$ In accordance with another aspect of the present invention, there is provided a lithium secondary battery comprising the above-mentioned cathode active material. In general, the lithium secondary battery is comprised of a cathode, an anode, a separator, and a non-aqueous electrolyte containing a lithium salt.

The cathode is, for example, fabricated by applying a mixture of the above-mentioned cathode active material, a conductive material and a binder to a cathode current collector, followed by drying. If desired, a filler may be added to the above mixture.

The cathode current collector is generally fabricated to have a thickness of 3 to 500 μm. There is no particular limit to the cathode current collector, so long as it has high conductivity without causing chemical changes in the battery. As examples of the cathode current collector, mention may be made of stainless steel, aluminum, nickel, titanium, sintered carbon and aluminum or stainless steel which was surface-treated with carbon, nickel, titanium or silver. The current collector may be fabricated to have fine irregularities on the surface thereof so as to enhance adhesiveness to the cathode active material. In addition, the current collector may take various forms including films, sheets, foils, nets, porous structures, foams and non-woven fabrics.

The conductive material utilized in the present invention is typically added in an amount of 1 to 50% by weight, based on the total weight of the mixture including the cathode active material. There is no particular limit to the conductive material, so long as it has suitable conductivity without causing chemical changes in the battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder, conductive whiskers such as zinc oxide and potassium titanate; conductive metal oxides such as titanium oxide; and polyphenylene derivatives.

The binder is an ingredient assisting in bonding between the active material and conductive material, and in binding to current collectors. The binder utilized in the present invention is typically added in an amount of 1 to 50% by weight, based on the total weight of the mixture including the cathode active material. As examples of the binder, mention may be made of polyvinylidene fluoride, polyvinyl alcohols, carboxymethyl-cellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene-butadiene rubber, fluoro rubber and various copolymers.

The filler is an optional ingredient that inhibits cathode expansion. There is no particular limit to the filler, so long as it does not cause chemical changes in the battery and is a fibrous material. As examples of the filler, there may be used olefin polymers such as polyethylene and polypropylene; and fibrous materials such as glass fiber and carbon fiber.

The anode is fabricated by applying an anode active material to an anode current collector, followed by drying. If necessary, other components, as described above, may be further added.

The anode current collector is generally fabricated to have a thickness of 3 to 500 μm. There is no particular limit to the anode current collector, so long as it has suitable conductivity without causing chemical changes in the battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be fabricated to form fine irregularities on the surface thereof so as to enhance adhesiveness to the anode active material. In addition, the anode current collector may take various forms including films, sheets, foils, nets, porous structures, foams and non-woven fabrics.

As examples of the anode active materials utilizable in the present invention, mention may be made of carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me=Mn, Fe, Pb or Ge; Me'=Al, B, P or Si, a group I, II or III element of the Periodic Table, or a halogen atom; $0 < x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O$, $Sb_2O_4$, $Sb_2O_5$, GeO, $GeO_2$, $Bi_2O_3$, $Bi_2O_4$, and $Bi_2O$; conductive polymers such as polyacetylene; and Li—Co—Ni-based materials.

The separator is disposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The non-aqueous electrolyte that can be utilized in the lithium secondary battery of the present invention may include cyclic carbonates and linear carbonates as a polar organic solvent. Examples of the cyclic carbonates include ethylene carbonate (EC), propylene carbonate (PC) and gamma-butyro lactone (GBL). The linear carbonate may preferably include, without limitation, at least one selected from the group consisting of diethylcarbonate (DEC), dimethylcarbonate (DMC), ethylmethylcarbonate (EMC) and methylpropylcarbonate (MPC). Further, the non-aqueous electrolyte contains a lithium salt in conjunction with the carbonate compound. Preferably, specific examples of lithium salts may be selected from the group consisting of $LiClO_4$, $LiCF_3SO_3$, $LiPF_6$, $LiBF_4$, $LiAsF_6$ and $LiN(CF_3SO_2)_2$ without being limited thereto.

The lithium secondary battery of the present invention may be prepared by conventional methods known in the art, for example disposing a porous separator between the cathode and anode, followed by introduction of a non-aqueous electrolyte.

There is no limit to shapes of the lithium secondary battery in accordance with the present invention, and for example, mention may be made of cylinders, squares or pouches.

EXAMPLES

Now, the present invention will be described in more detail with reference to the following examples. These examples are provided only for illustrating the present invention and should not be construed as limiting the scope and spirit of the present invention.

Example 1

2.5 g of an active material, which was composed of a mixture of LiCoO$_2$ having an average particle size of 20 µm and LiNi$_{1/3}$Mn$_{1/3}$Co$_{1/3}$O$_2$ having an average particle size of 5 µm in a weight ratio of 9:1, was placed in a cylindrical mold having a diameter of 1.5 cm and was pressurized under pressure of 4000 psi for 5 min. Thereafter, the thickness of the mold filled with the active material and the initial thickness of the empty mold prior to introduction of the active material were respectively determined, thereby calculating the thickness of the molded active material. In addition, taking into account when a ratio of the active material, a conductive material and a binder was 95:2.5:2.5, based on this calculation result, an electrode density and changes of voids in an actual electrode were calculated. The experimental results thus obtained are given in Table 1 below.

Example 2

An experiment was carried out in the same manner as in Example 1, except that 2.5 g of an active material composed of LiCoO$_2$ having an average particle size of 20 µm and LiNi$_{1/3}$Mn$_{1/3}$Co$_{1/3}$O$_2$ having an average particle size of 5 µm in a weight ratio of 8.5:1.5 was added. The experimental results thus obtained are given in Table 1 below.

Example 3

An experiment was carried out in the same manner as in Example 1, except that 2.5 g of an active material composed of LiCoO$_2$ having an average particle size of 20 µm and LiNi$_{1/3}$Mn$_{1/3}$Co$_{1/3}$O$_2$ having an average particle size of 5 µm in a weight ratio of 8:2 was added. The experimental results thus obtained are given in Table 1 below.

Example 4

An experiment was carried out in the same manner as in Example 1, except that 2.5 g of an active material composed of LiCoO$_2$ having an average particle size of 20 µm and LiNi$_{1/3}$Mn$_{1/3}$Co$_{1/3}$O$_2$ having an average particle size of 5 µm in a weight ratio of 7:3 was added. The experimental results thus obtained are given in Table 1 below.

Comparative Example 1

An experiment was carried out in the same manner as in Example 1, except that 2.5 g of LiCoO$_2$ having an average particle size of 20 µm was added as an active material. The experimental results thus obtained are given in Table 1 below.

Comparative Example 2

An experiment was carried out in the same manner as in Example 1, except that 2.5 g of an active material composed of LiCoO$_2$ having an average particle size of 20 µm and LiCoO$_2$ having an average particle size of 5 µm in a weight ratio of 9:1 was added. The experimental results thus obtained are given in Table 1 below.

Comparative Example 3

An experiment was carried out in the same manner as in Example 1, except that 2.5 g of an active material composed of LiCoO$_2$ having an average particle size of 20 µm and LiCoO$_2$ having an average particle size of 5 µm in a weight ratio of 8:2 was added. The experimental results thus obtained are given in Table 1 below.

TABLE 1

| Active material | Thickness (cm) | Electrode density (g/cc) | Electrode porosity (%) |
| --- | --- | --- | --- |
| Comp. Example 1 | 0.39 | 3.629 | 18.6 |
| Comp. Example 2 | 0.38 | 3.724 | 16.4 |
| Comp. Example 3 | 0.379 | 3.737 | 16.1 |
| Example 1 | 0.384 | 3.685 | 16.9 |
| Example 2 | 0.38 | 3.724 | 15.8 |
| Example 3 | 0.38 | 3.724 | 15.6 |
| Example 4 | 0.388 | 3.646 | 18.2 |

As can be seen from Table 1, when the active materials having a different particle diameter to each other were mixed (Comparative Examples 2 and 3, and Examples 1 through 4), a density between active materials was increased and the void was decreased, as compared to when the active material having the same particle diameter was used alone.

Example 5

An active material mixed in a weight ratio as in Example 3, a conductive material and a binder were mixed in a ratio of 95:2.5:2.5 to prepare a slurry. The slurry thus obtained was coated on aluminum (Al) foil having a thickness of 20 µm to prepare a cathode. Thereafter, a coin-type cell was manufactured using the thus-prepared cathode, a lithium metal as an anode, and 1M LiPF$_6$ in EC:EMC (1:2) as an electrolyte.

Example 6

An active material mixed in a weight ratio as in Example 4, a conductive material and a binder were mixed in a ratio of 95:2.5:2.5 to prepare a slurry. The slurry thus obtained was coated on aluminum (Al) foil having a thickness of 20 µm to prepare a cathode. Thereafter, a coin-type cell was manufactured using the thus-prepared cathode, a lithium metal as an anode, and 1M LiPF$_6$ in EC:EMC (1:2) as an electrolyte.

Comparative Example 4

An active material of Comparative Example 1, a conductive material and a binder were mixed in a ratio of 95:2.5:2.5 to prepare a slurry. The slurry thus obtained was coated on aluminum (Al) foil having a thickness of 20 µm to prepare a cathode. Thereafter, a coin-type cell was manufactured using the thus-prepared cathode, a lithium metal as an anode, and 1M LiPF$_6$ in EC:EMC (1:2) as an electrolyte.

Comparative Example 5

An active material mixed in a weight ratio as in Comparative Example 3, a conductive material and a binder were mixed in a ratio of 95:2.5:2.5 to prepare a slurry. The slurry thus obtained was coated on aluminum foil (Al) having a thickness of 20 µm to prepare a cathode. Thereafter, a coin-type cell was manufactured using the thus-prepared cathode, a lithium metal as an anode, and 1M LiPF$_6$ in EC:EMC (1:2) as an electrolyte.

Figure 7:
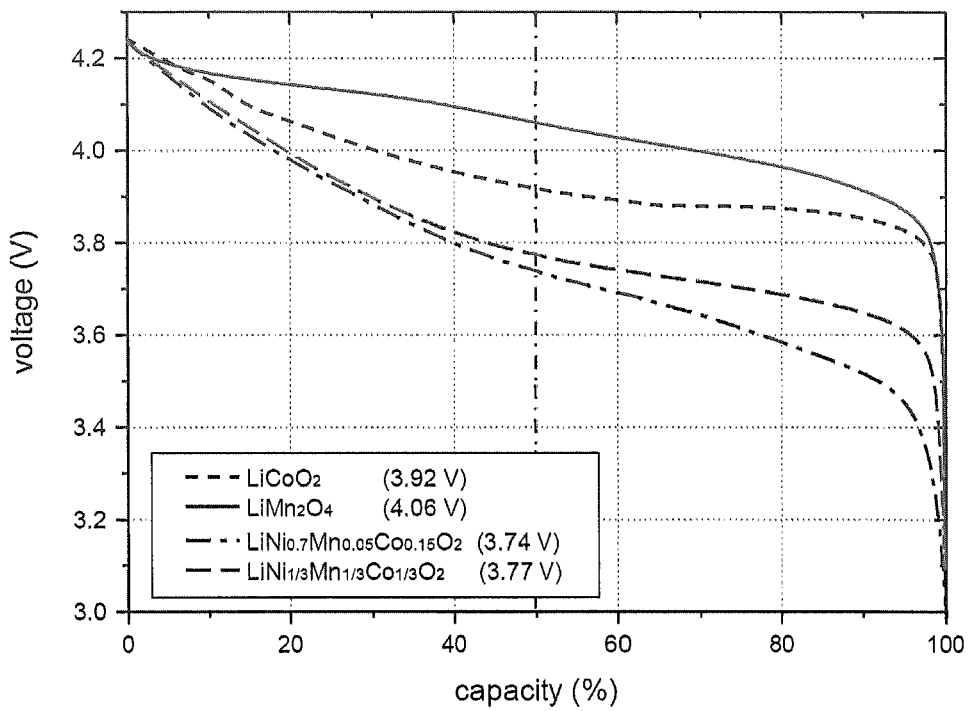
FIG. 7 is a graph showing electric potential changes versus discharge capacity (discharge rate) of active materials used in some experiments of the present invention.

FIG. 7 is a graph showing electric potential changes versus discharge capacity (discharge rate) of active materials used in some experiments. As can be seen from FIG. 7, the respective active materials exhibit plateau ranges having substantially no changes of a slope at a discharge rate of about 10 to 90%. In the following experiments, redox levels of active materials concerned are established as the magnitude of electric potentials at a 50% discharge rate. For example, the redox level of LiCoO$_2$ is 3.92 V while that of LiNi$_{1/3}$Mn$_{1/3}$Co$_{1/3}$O$_2$ is 3.77 V, and therefore two active materials exhibit a redox potential difference of about 0.15 V therebetween.

Experimental Example 1

Figure 8:
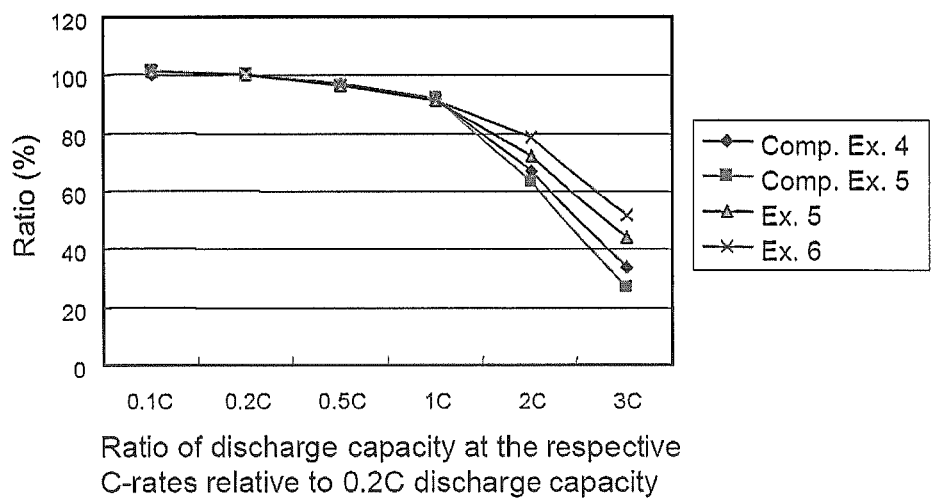
FIG. 8 is a comparison graph of discharge capacity corresponding to each C-rate, obtained in Experimental Example 1 for battery cells of Examples 5 and 6 and Comparative Examples 4 and 5.

For battery cells prepared in Examples 5 and 6 and battery cells prepared in Comparative Examples 4 and 5, discharge capacity (charged at 0.2 C rate) thereof was measured at 0.1 C, 0.2 C, 0.5 C, 1 C, 2 C and 3 C rates, and a ratio of discharge capacity at the respective C-rates relative to 0.2 C discharge capacity was calculated. The results thus obtained are shown in FIG. 8. As shown in FIG. 8, it can be seen that use of two active materials having different redox potentials as in Examples 5 and 6 provides gradually better results starting from the C-rate of more than 1 C, as compared to use of one active material having the same particle diameter as in Comparative Example 4 or use of one active material having the different particle diameter as in Comparative Example 5. In particular, it can be seen that an increasing ratio of LiNi$_{1/3}$Mn$_{1/3}$Co$_{1/3}$O$_2$ results in superior results.

Upon considering the fact that LiCoO$_2$ is known to have C rate characteristics superior to LiNi$_{1/3}$Mn$_{1/3}$Co$_{1/3}$O$_2$ (see FIG. 7), the results of Examples 5 and 6, exhibiting improved C rate characteristics by addition of LiNi$_{1/3}$Mn$_{1/3}$Co$_{1/3}$O$_2$ having inferior C rate characteristics to LiCoO$_2$ as contrary to the expectation, are extraordinarily new results that were completely unpredictable from conventional arts.

Example 7

An active material composed of a mixture of LiCoO$_2$ having an average particle size of 20 μm and LiNi$_{1/3}$Co$_{1/3}$Mn$_{1/3}$O$_2$ having an average particle size of 5 μm in a weight ratio of 1:1, a conductive material and a binder were mixed in a ratio of 95:2.5:2.5 to prepare a slurry. The slurry thus obtained was coated on aluminum foil (Al) having a thickness of 20 μm to prepare a cathode. Thereafter, a coin-type cell was manufactured using the thus-prepared cathode, a lithium metal as an anode, and 1M LiPF$_6$ in EC:EMC (1:2) as an electrolyte.

Example 8

An active material composed of a mixture of LiNi$_{0.8}$Co$_{0.15}$Mn$_{0.05}$O$_2$ having an average particle size of 18 μm and LiMn$_2$O$_4$ having an average particle size of 5 μm in a weight ratio of 7:3, a conductive material and a binder were mixed in a ratio of 95:2.5:2.5 to prepare a slurry. The slurry thus obtained was coated on aluminum foil (Al) having a thickness of 20 μm to prepare a cathode. Thereafter, a coin-type cell was manufactured using the thus-prepared cathode, a lithium metal as an anode, and 1M LiPF$_6$ in EC:EMC (1:2) as an electrolyte.

Example 9

An active material composed of a mixture of LiNi$_{1/3}$Mn$_{1/3}$Co$_{1/3}$O$_2$ having an average particle size of 18 μm and LiMn$_2$O$_4$ having an average particle size of 5 μm in a weight ratio of 7:3, a conductive material and a binder were mixed in a ratio of 95:2.5:2.5 to prepare a slurry. The slurry thus obtained was coated on aluminum foil (Al) having a thickness of 20 μm to prepare a cathode. Thereafter, a coin-type cell was manufactured using the thus-prepared cathode, a lithium metal as an anode, and 1M LiPF$_6$ in EC:EMC (1:2) as an electrolyte.

Comparative Example 6

An active material composed of LiCoO$_2$ having an average particle size of 20 μm, a conductive material and a binder were mixed in a ratio of 95:2.5:2.5 to prepare a slurry. The slurry thus obtained was coated on aluminum (Al) foil having a thickness of 20 μm to prepare a cathode. Thereafter, a coin-type cell was manufactured using the thus-prepared cathode, a lithium metal as an anode, and 1M LiPF$_6$ in EC:EMC (1:2) as an electrolyte.

Comparative Example 7

An active material composed of LiNi$_{0.5}$Co$_{0.15}$Mn$_{0.05}$O$_2$ having an average particle size of 18 μm, a conductive material and a binder were mixed in a ratio of 95:2.5:2.5 to prepare a slurry. The slurry thus obtained was coated on aluminum (Al) foil having a thickness of 20 μm to prepare a cathode. Thereafter, a coin-type cell was manufactured using the thus-prepared cathode, a lithium metal as an anode, and 1M LiPF$_6$ in EC:EMC (1:2) as an electrolyte.

Comparative Example 8

An active material composed of LiNi$_{1/3}$Mn$_{1/3}$Co$_{1/3}$O$_2$ having an average particle size of 20 μm, a conductive material and a binder were mixed in a ratio of 95:2.5:2.5 to prepare a slurry. The slurry thus obtained was coated on aluminum (Al) foil having a thickness of 20 μm to prepare a cathode. Thereafter, a coin-type cell was manufactured using the thus-prepared cathode, a lithium metal as an anode, and 1M LiPF$_6$ in EC:EMC (1:2) as an electrolyte.

Experimental Example 2

Figure 9:
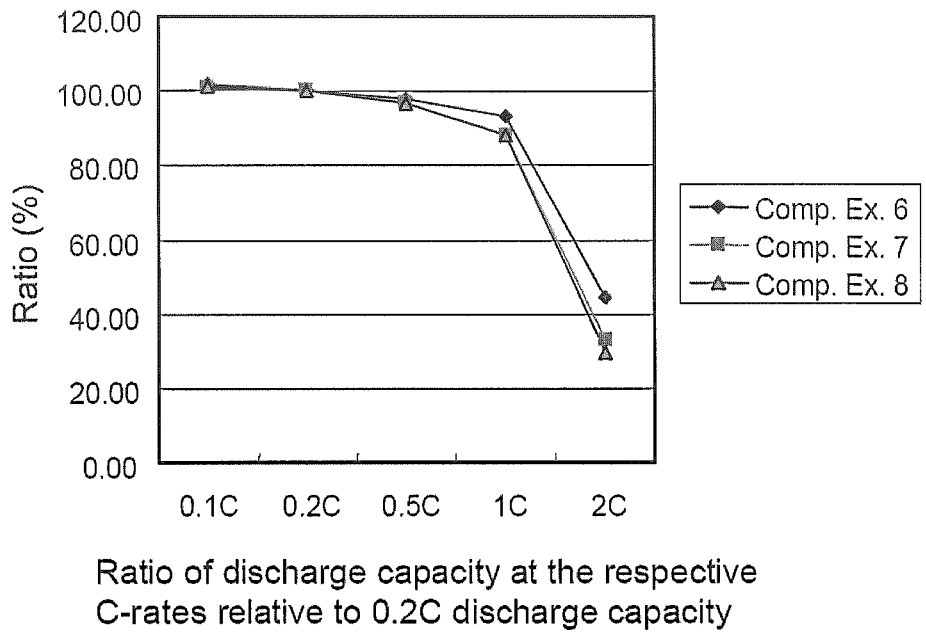
FIG. 9 is a comparison graph of discharge capacity corresponding to each C-rate, obtained in Experimental Example 2 for battery cells of Comparative Examples 6 through 8.
Figure 10:
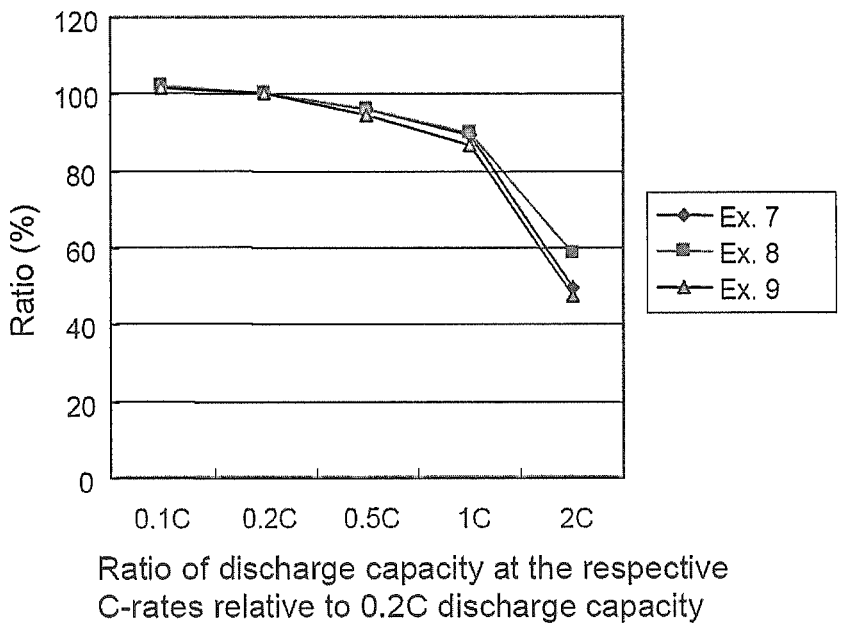
FIG. 10 is a comparison graph of discharge capacity corresponding to each C-rate, obtained in Experimental Example 2 for battery cells of Examples 7 through 9.

For respective battery cells prepared in Comparative Examples 6 through 8, discharge capacity (charged at 0.2 C rate) thereof was measured at discharge rates of 0.1 C, 0.2 C, 0.5 C, 1 C and 2 C, and was then calculated as a ratio relative to 0.2 C discharge capacity. The results thus obtained are shown in FIG. 9. In addition, for battery cells prepared in Examples 7 through 9, discharge capacity thereof was measured at discharge rates of 0.1 C, 0.2 C, 0.5 C, 1 C and 2 C, and was then calculated as a ratio relative to 0.2 C discharge capacity. The results thus obtained are shown in FIG. 10. Similar to FIG. 8, it can be seen from two graphs that C rate characteristics were improved, in spite of the fact that LiCoO$_2$ having superior C rate characteristics was mixed with LiNi$_{0.8}$Co$_{0.1}$Mn$_{0.1}$O$_2$ having relatively poor C rate characteristics.

Further, it can be seen that LiNi$_{0.8}$Co$_{0.15}$Mn$_{0.05}$O$_2$ and LiNi$_{1/3}$Mn$_{1/3}$Co$_{1/3}$O$_2$ also exhibit improvement in C rate characteristics, when they are used in admixture with LiMn$_2$O$_4$ having a different redox level, as compared to when they are used alone. For reference, LiNi$_{0.8}$Co$_{0.1}$Mn$_{0.1}$O$_2$ has a redox level of 3.80 V and that of LiMn$_2$O$_4$ is 4.06 V.

Example 10

An active material mixed in a weight ratio as in Example 4, a conductive material and a binder were mixed in a ratio of 95:2.5:2.5 to prepare a slurry. The slurry thus obtained was coated on aluminum (Al) foil having a thickness of 20 μm to prepare a cathode having a loading amount of 2.5 mAh/cm$^2$. Thereafter, a coin-type cell was manufactured using the thus-prepared cathode, a lithium metal as an anode, and 1M LiPF$_6$ in EC:EMC (1:2) as an electrolyte.

Example 11

An active material mixed in a weight ratio as in Example 4, a conductive material and a binder were mixed in a ratio of 95:2.5:2.5 to prepare a slurry. The slurry thus obtained was coated on aluminum (Al) foil having a thickness of 20 μm to prepare a cathode having a loading amount of 3.0 mAh/cm$^2$.

Thereafter, a coin-type battery cell was manufactured using the thus-prepared cathode, a lithium metal as an anode, and 1M LiPF$_6$ in EC:EMC (1:2) as an electrolyte.

Example 12

An active material mixed in a weight ratio as in Example 4, a conductive material and a binder were mixed in a ratio of 95:2.5:2.5 to prepare a slurry. The slurry thus obtained was coated on aluminum (Al) foil having a thickness of 20 μm to prepare a cathode having a loading amount of 3.5 mAh/cm$^2$. Thereafter, a coin-type battery cell was manufactured using the thus-prepared cathode, a lithium metal as an anode, and 1M LiPF$_6$ in EC:EMC (1:2) as an electrolyte.

Comparative Example 9

An active material of Comparative Example 1, a conductive material and a binder were mixed in a ratio of 95:2.5:2.5 to prepare a slurry. The slurry thus obtained was coated on aluminum (Al) foil having a thickness of 20 μm to prepare a cathode having a loading amount of 2.5 mAh/cm$^2$. Thereafter, a coin-type battery cell was manufactured using the thus-prepared cathode, a lithium metal as an anode, and 1M LiPF$_6$ in EC:EMC (1:2) as an electrolyte.

Comparative Example 10

An active material of Comparative Example 1, a conductive material and a binder were mixed in a ratio of 95:2.5:2.5 to prepare a slurry. The slurry thus obtained was coated on aluminum (Al) foil having a thickness of 20 μm to prepare a cathode having a loading amount of 3.0 mAh/cm$^2$. Thereafter, a coin-type battery cell was manufactured using the thus-prepared cathode, a lithium metal as an anode, and 1M LiPF$_6$ in EC:EMC (1:2) as an electrolyte.

Comparative Example 11

An active material of Comparative Example 1, a conductive material and a binder were mixed in a ratio of 95:2.5:2.5 to prepare a slurry. The slurry thus obtained was coated on aluminum (Al) foil having a thickness of 20 μm to prepare a cathode having a loading amount of 3.5 mAh/cm$^2$. Thereafter, a coin-type battery cell was manufactured using the thus-prepared cathode, a lithium metal as an anode, and 1M LiPF$_6$ in EC:EMC (1:2) as an electrolyte.

Experimental Example 3

Figure 11:
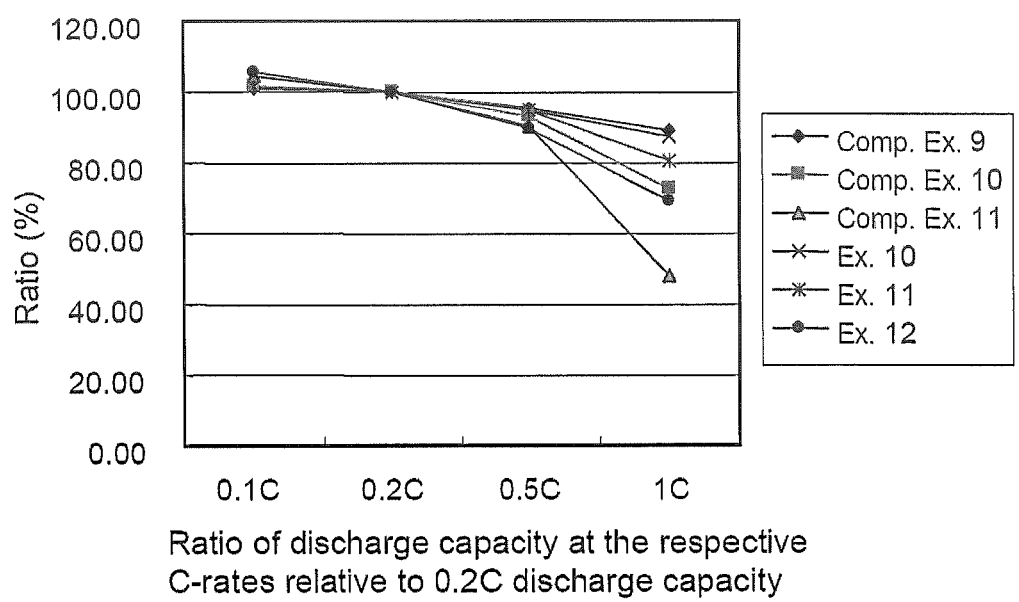
FIG. 11 is a comparison graph of discharge capacity corresponding to each C-rate, obtained in Experimental Example 3 for battery cells of Examples 10 through 12 and Comparative Examples 9 through 11.

For respective battery cells prepared in Comparative Examples 9 through 11 and Examples 10 through 12, discharge capacity thereof was measured at discharge rates of 0.1 C, 0.2 C, 0.5 C and 1 C, and was then calculated as a ratio relative to the reference discharge capacity at 0.2 C rate. The results thus obtained are shown in FIG. 11. As shown in FIG. 11, it can be seen that the cells of Comparative Example 9 and Example 10, having low-loading amounts, exhibited similar C rate characteristics therebetween, whereas the cells of Comparative Examples 10 and 11, and Examples 11 and 12, which use a mixture of two active materials having different redox levels with increasing loading amounts, exhibited improvement in C rate characteristics.

Example 13

A mixed active material of Example 4 (a mixture of LiCoO$_2$ having an average particle size of 20 μm and LiNi$_{1/3}$Mn$_{1/3}$Co$_{1/3}$O$_2$ having an average particle size of 5 μm), a conductive material and a binder were mixed in a weight ratio of 95:2.5:2.5 to prepare a slurry. The slurry thus obtained was coated on aluminum (Al) foil having a thickness of 20 μm to prepare a cathode with a loading amount of 2.4 mAh/cm$^2$ (based on a discharge loading). In addition, artificial graphite, a conductive material and a binder were mixed in a weight ratio of 94:1:5 to prepare a slurry. The slurry thus obtained was coated on copper (Cu) foil having a thickness of 10 μm to prepare an anode with a loading amount of 2.4 mAh/cm$^2$ (based on discharge loading). The thus-prepared cathode and anode were stacked with intercalation of a separator therebetween, thereby preparing an electrode assembly. The electrode assembly was built in a pouch-type case made up of an aluminum laminate sheet to which 1M LiPF$_6$ impregnated in EC:EMC (1:2) as an electrolyte was then introduced, thereby preparing a pouch-type cell (full cell).

Comparative Example 12

An active material composed of LiCoO$_2$ having an average particle size of 5 μm, a conductive material and a binder were mixed in a weight ratio of 95:2.5:2.5 to prepare a slurry. The slurry thus obtained was coated on aluminum (Al) foil having a thickness of 20 μm to prepare a cathode with a loading amount of 2.4 mAh/cm$^2$ (based on discharge loading). In addition, artificial graphite, a conductive material and a binder were mixed in a ratio of 94:1:5 to prepare a slurry. The slurry thus obtained was coated on copper (Cu) foil having a thickness of 10 μm to prepare an anode with a loading amount of 2.4 mAh/cm$^2$ (based on discharge loading). The thus-prepared cathode and anode were stacked with intercalation of a separator therebetween, thereby preparing an electrode assembly. The electrode assembly was built in a pouch-type case made up of an aluminum laminate sheet to which 1M LiPF$_6$ impregnated in EC:EMC (1:2) as an electrolyte was the introduced, thereby preparing a pouch-type cell (full cell).

Comparative Example 13

An active material composed of LiCoO$_2$ having an average particle size of 5 μm, a conductive material and a binder were mixed in a ratio of 95:2.5:2.5 to prepare a slurry. The slurry thus obtained was coated on aluminum (Al) foil having a thickness of 20 μm to prepare a cathode. Thereafter, a coin cell was prepared using the thus-prepared cathode, a lithium metal as an anode, and 1M LiPF$_6$ in EC:EMC (1:2) as an electrolyte.

Experimental Example 4

Figure 12:
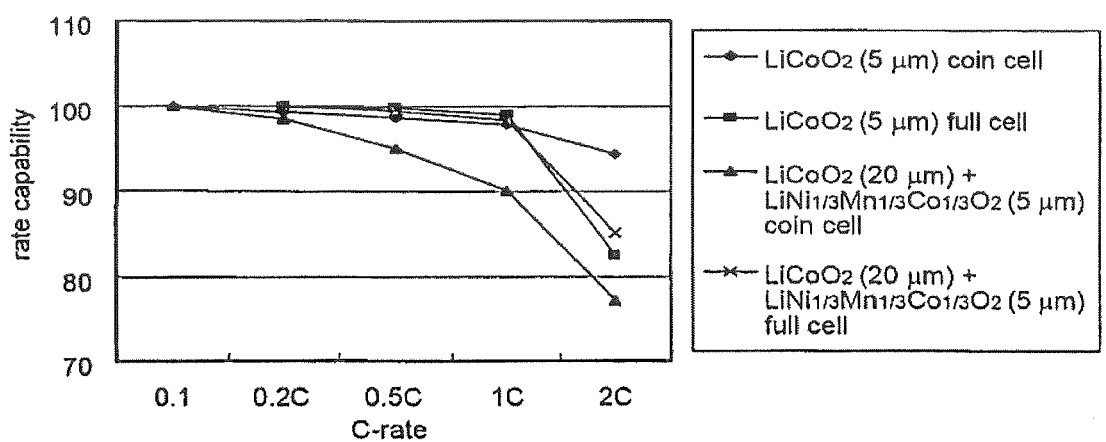
FIG. 12 is a comparison graph of discharge capacity corresponding to the respective C-rates, obtained in Experimental Example 4 for battery cells of Examples 6 and 13, and Comparative Examples 12 and 13.

For cells prepared in Examples 6 and 13 and cells prepared in Comparative Examples 12 and 13, discharge capacity (charged at 0.2 C rate) thereof was measured at 0.1 C, 0.2 C, 0.5 C, 1 C and 2 C rates. The results thus obtained are shown in FIG. 12. Although the cells of Examples 6 and 13 have the same composition of active materials (using a mixed active material of LiCoO$_2$ having an average particle size of 20 μm and LiNi$_{1/3}$Mn$_{1/3}$Co$_{1/3}$O$_2$ having an average particle size of 5 μm), the cell of Example 13 is a cell having a full-cell structure while the cell of Example 6 is a cell having a coin-type structure. Similarly, although the cells of Comparative Examples 12 and 13 have the same composition of active materials (using an active material LiCoO$_2$ having an average particle size of 5 μm), the cell of Comparative Example 12 is of a full-cell structure while the cell of Comparative Example 13 is of a coin-type structure.

Generally, in active materials belonging to the same class, a smaller size of the active materials results in superior C rate characteristics. Therefore, as compared to the cell of Comparative Example 6 (see FIG. 9) using LiCoO$_2$ having an average particle size of 20 μm as the active material, the cell of Comparative Example 13 using LiCoO$_2$ having an average particle size of 5 μm as the active material, as shown in FIG. 12, generally exhibit superior discharge characteristics even in the range of high-rate discharge when the cell is of a coin-type structure.

However, as discussed hereinbefore, as large consumption of the electrolyte occurs in the range of high-rate discharge, there is a tendency of sharply decreased discharge characteristics in a full-cell structure of the cell in which the electrolyte acts as a limiting factor, as compared to the coin type structure of the cell exhibiting no limitation to the electrolyte. As a result, it was confirmed that the cell using 5 μm-sized LiCoO$_2$ having superior C rate characteristics as the active material, when it was manufactured in the form of a full-cell structure as in Comparative Example 13(12?), also exhibited a rapid decrease of discharge characteristics in the range of high-rate discharge as shown in FIG. 12.

On the other hand, it was confirmed that use of the mixed active material in accordance with the present invention leads to improvement in discharge characteristics even in a full-cell structure of the cell in which the electrolyte acts as a limiting factor. As discussed hereinbefore, LiNi$_{1/3}$Mn$_{1/3}$Co$_{1/3}$O$_2$ exhibits C-rate characteristics inferior to LiCoO$_2$. Whereas, it can be confirmed from FIG. 12 that even though a cell having a full-cell structure was manufactured by addition of LiNi$_{1/3}$Mn$_{1/3}$Co$_{1/3}$O$_2$ to 20 μm-sized LiCoO$_2$ having C-rate characteristics inferior to 5 μm-sized LiCoO$_2$ in Example 13, this cell exhibits superior discharge characteristics in the range of high-rate discharge, as compared to the cell of Example 6 which was manufactured in the coin-type structure having the same composition.

These are results that were completely unpredictable from conventional arts. Based on these facts, it can be seen that even active materials having superior C-rate characteristics, but unfortunately showing limitation of application thereof to the battery in which the electrolyte acts as a limiting factor, can essentially overcome such problems via inventive constitution in accordance with the present invention.

Example 14

An active material mixed in a weight ratio as in Example 1, a conductive material and a binder were mixed in a ratio of 95:2.5:2.5 to prepare a slurry. The slurry thus obtained was coated on aluminum (Al) foil having a thickness of 20 μm to prepare a cathode. Thereafter, a coin-type cell was prepared using the thus-prepared cathode, a lithium metal as an anode, and 1M LiPF$_6$ in EC:EMC (1:2) as an electrolyte.

Example 15

An active material mixed in a weight ratio as in Example 2, a conductive material and a binder were mixed in a ratio of 95:2.5:2.5 to prepare a slurry. The slurry thus obtained was coated on aluminum (Al) foil having a thickness of 20 μm to prepare a cathode. Thereafter, a coin-type cell was prepared using the thus-prepared cathode, a lithium metal as an anode, and 1M LiPF$_6$ in EC:EMC (1:2) as an electrolyte.

Experimental Example 5

Figure 13:
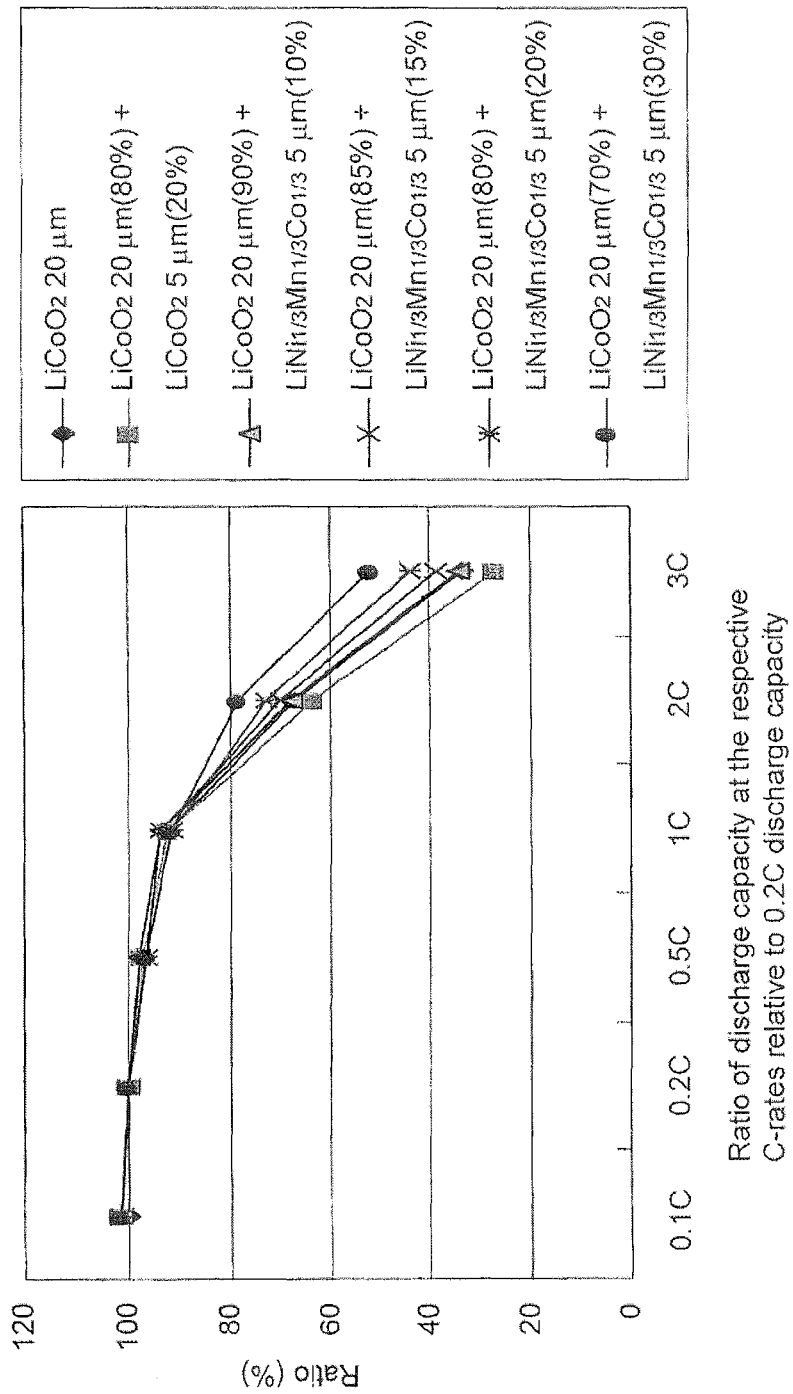
FIG. 13 is a comparison graph of discharge capacity corresponding to each C-rate, obtained in Experimental Example 5 for battery cells of Examples 14 and 15.

For cells prepared in Examples 14 and 15, experiments were carried out in the same manner as in Experimental Example 1. The results thus obtained are shown in FIG. 13. For comparison, experimental results of Experimental Example 1 are also given in FIG. 13. As can be seen from FIG. 13, the battery in which 10% by weight of LiNi$_{1/3}$Mn$_{1/3}$Co$_{1/3}$O$_2$ having a particle diameter of 5 μm was added to LiCoO$_2$ having a particle diameter of 20 μm did not exhibit a significant difference in addition effects, as compared to the cell of Comparative Example 4 in which LiCoO$_2$ having a particle diameter of 20 μm was used alone, but addition of 15% by weight of LiNi$_{1/3}$Mn$_{1/3}$Co$_{1/3}$O$_2$ having a particle diameter of 5 μm began to result in pronounced improvement in C rate characteristics.

Comparative Examples 14 through 21

Using LiMn$_2$O$_4$ (Comparative Example 14), LiNi$_{1/3}$Mn$_{1/3}$Co$_{1/3}$O$_2$ (Comparative Example 15), LiNi$_{0.8}$Mn$_{0.1}$Co$_{0.1}$O$_2$ (Comparative Example 16), LiNi$_{0.7}$Mn$_{0.05}$Co$_{0.25}$O$_2$ (Comparative Example 17), LiNi$_{0.8}$Co$_{0.2}$O$_2$ (Comparative Example 18), LiNi$_{0.5}$Mn$_{0.5}$O$_2$ (Comparative Example 19), LiNi$_{0.45}$Mn$_{0.45}$Co$_{0.1}$O$_2$ (Comparative Example 20) and LiNi$_{0.425}$Mn$_{0.425}$Co$_{0.15}$O$_2$ (Comparative Example 21), having various particle diameters as set forth in Table 2 below, the corresponding battery cells were respectively manufactured in the same manner as in Example 13.

Examples 16 and 17

Using a mixed active material of LiMn$_2$O$_4$ having a particle diameter of 15 μm and LiNi$_{0.8}$Mn$_{0.1}$Co$_{0.1}$O$_2$ having a particle diameter of 6 μm (Example 16), and a mixed active material of LiMn$_2$O$_4$ having a particle diameter of 15 μm and LiNi$_{1/3}$Mn$_{1/3}$Co$_{1/3}$O$_2$ having a particle diameter of 5 μm (Example 17), respectively, as set forth in Table 2 below, the corresponding cells were manufactured in the same manner as in Example 13.

Comparative Examples 22 Through 24

Using a mixed active material of LiNi$_{0.7}$Mn$_{0.05}$Co$_{0.25}$O$_2$ having a particle diameter of 12 μm and LiNi$_{0.8}$Co$_{0.2}$O$_2$ having a particle diameter of 6 μm (Comparative Example 22), a mixed active material of LiNi$_{0.425}$Mn$_{0.425}$Co$_{0.15}$O$_2$ having a particle diameter of 6 μm and LiNi$_{0.45}$Mn$_{0.45}$Co$_{0.1}$O$_2$ having a particle diameter of 6 μm (Comparative Example 23) and a mixed active material of LiNi$_{0.425}$Mn$_{0.425}$Co$_{0.15}$O$_2$ having a particle diameter of 6 μm and LiNi$_{0.5}$Mn$_{0.5}$O$_2$ having a particle diameter of 6 μm (Comparative Example 24), respectively, as set forth in Table 2 below, the corresponding cells were manufactured in the same manner as in Example 13.

Experimental Example 6

Figure 14:
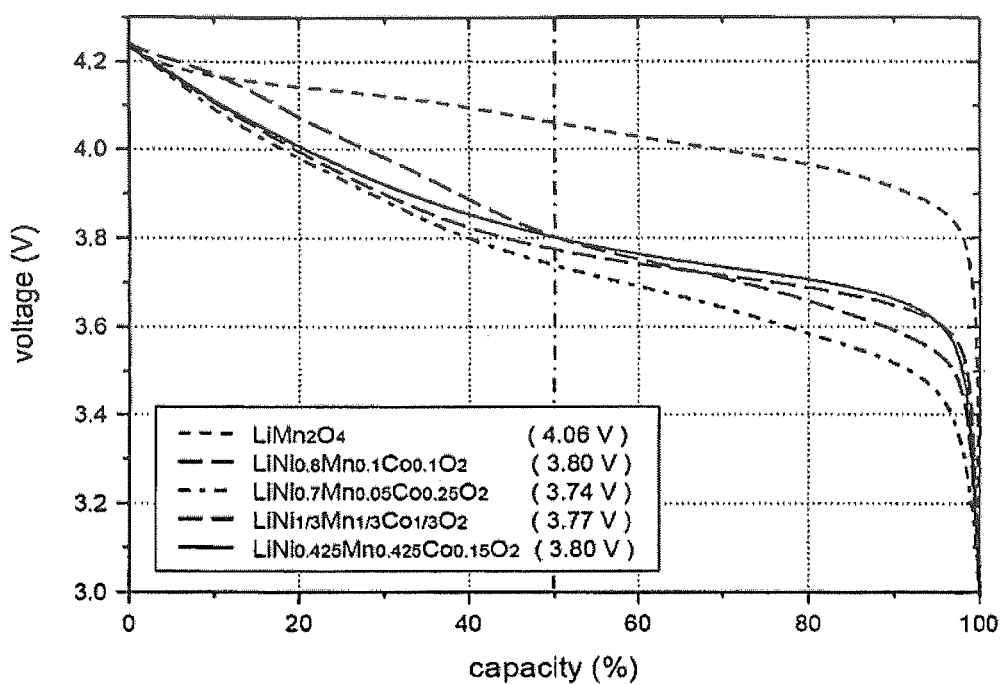
FIG. 14 is a graph showing electric potential changes versus discharge rate of active materials used for preparing battery cells of some Comparative Examples of the present invention.

First, electrical potential changes versus a discharge rate for LiMn$_2$O$_4$, LiNi$_{1/3}$Mn$_{1/3}$Co$_{1/3}$O$_2$, LiNi$_{0.8}$Mn$_{0.1}$Co$_{0.1}$O$_2$, LiNi$_{0.7}$Mn$_{0.05}$Co$_{0.25}$O$_2$ and LiNi$_{0.425}$Mn$_{0.425}$Co$_{0.15}$O$_2$, which were active materials used to prepare cells of Comparative Examples 14-17 and 21, were measured. The results thus obtained are shown in FIG. 14. As can be seen from FIG. 14, the respective active materials exhibit different redox levels therebetween.

Figure 15:
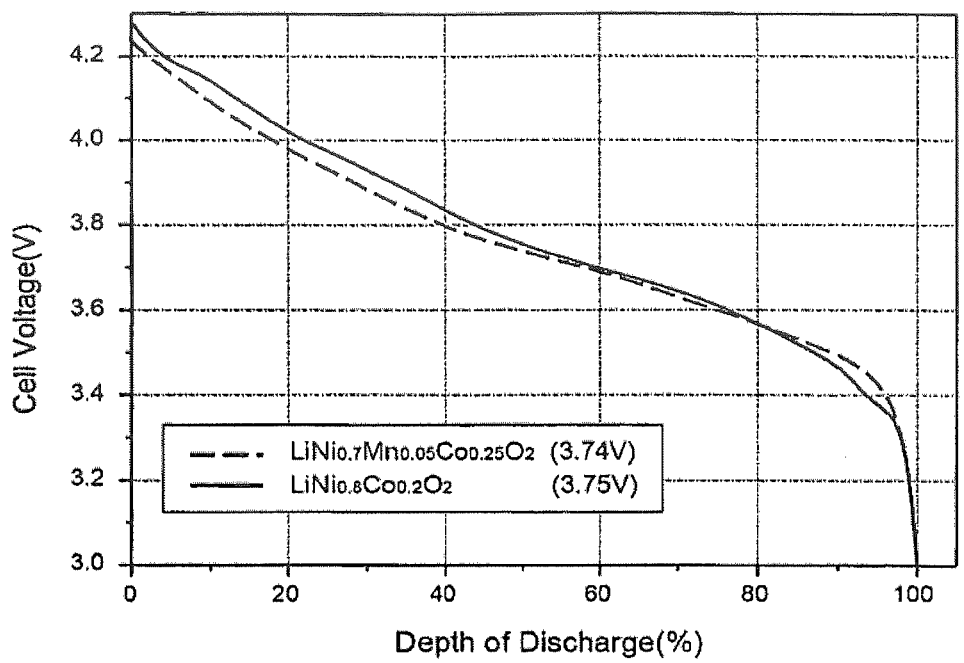
FIGS. 15 and 16 are graphs showing electric potential changes versus discharge rate of active materials used for preparing battery cells of some Comparative Examples of the present invention.
Figure 16:
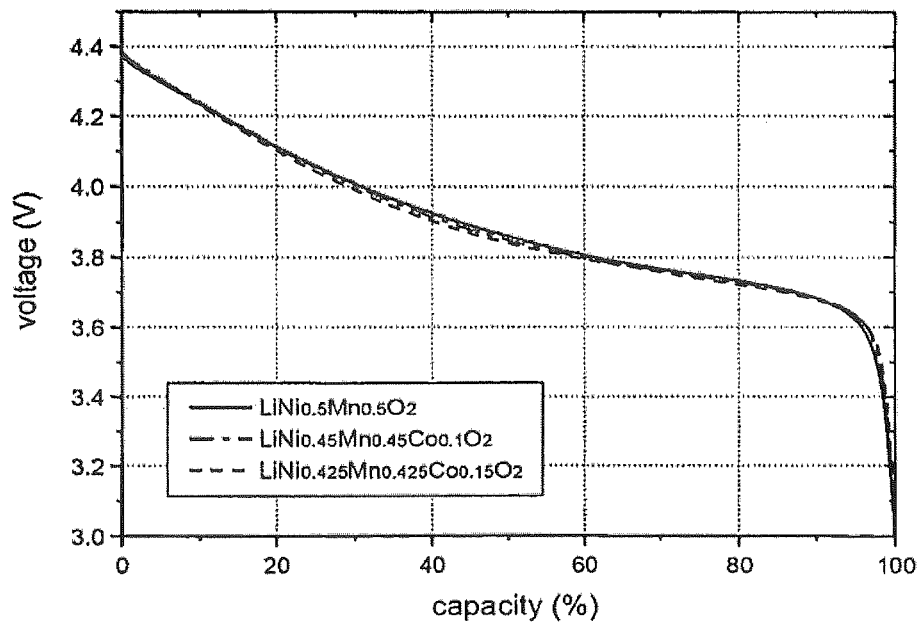

In addition, for LiNi$_{0.7}$Mn$_{0.05}$Co$_{0.25}$O$_2$, LiNi$_{0.8}$Co$_{0.25}$O$_2$, LiNi$_{0.8}$Mn$_{0.8}$O$_2$, LiNi$_{0.45}$Mn$_{0.45}$Co$_{0.1}$O$_2$ and LiNi$_{0.425}$Mn$_{0.425}$Co$_{0.15}$O$_2$, which were active materials used to prepare cells of Comparative Examples 22 through 24, electrical potential changes versus a discharge rate were measured. The results thus obtained are shown in FIGS. 15 and 16. As can be seen from there, active materials used to prepare cells of Comparative Examples 22 through 24 were composed of combinations of active materials having very small redox potential difference therebetween.

Meanwhile, for the respective cells prepared in Comparative Examples 14 through 24 and Examples 16 and 17, discharge capacity thereof was measured at 0.1 C, 0.2 C, 0.5 C, 1.0 C, 2.0 C, 3.0 C and 5.0 C rates. The results thus obtained are shown in Table 2 below. Calculated values given in Table 2 below are values in which C rates (observed values) individually measured for the respective active materials of Comparative Examples 14 through 21 were calculated as a mixing ratio between the respective components upon constituting cathodes in Examples 16 and 17 and Comparative Examples 22 through 24.

TABLE 2

| Materials | Rate | C-rate (150 mAh/g 1C) | | | | | | |
|---|---|---|---|---|---|---|---|---|
| | | 0.1 | 0.2 | 0.5 | 1.0 | 2.0 | 3.0 | 5.0 |
| $LiMn_2O_4$ (15 μm) | Ob* | 100.0 | 100.2 | 100.1 | 99.6 | 97.0 | 86.4 | 71.5 |
| $LiNi_{1/3}Mn_{1/3}Co_{1/3}O_2$ (5 μm) | Ob | 100.0 | 98.0 | 95.2 | 92.4 | 88.8 | 85.1 | 78.2 |
| $LiNi_{0.8}Mn_{0.1}Co_{0.1}O_2$ (6 μm) | Ob | 100.0 | 97.2 | 93.7 | 90.7 | 87.4 | 84.3 | 75.1 |
| $LiNi_{0.7}Mn_{0.05}Co_{0.25}O_2$ (12 μm) | Ob | 100.0 | 97.2 | 93.1 | 89.6 | 85.5 | 81.8 | 71.3 |
| $LiNi_{0.8}Co_{0.2}O_2$ (6 μm) | Ob | 100.0 | 96.7 | 91.8 | 87.2 | 83.4 | 79.2 | 67.1 |
| $LiNi_{0.5}Mn_{0.5}O_2$ (6 μm) | Ob | 100.0 | 96.5 | 91.6 | 84.2 | 76.3 | 65.4 | 50.3 |
| $LiNi_{0.45}Mn_{0.45}Co_{0.1}O_2$ (6 μm) | Ob | 100.0 | 97.1 | 92.6 | 88.1 | 81.9 | 76.2 | 63.2 |
| $Ni_{0.425}Mn_{0.425}CoCo_{0.15}O_2$ (6 μm) | Ob | 100.0 | 97.7 | 93.0 | 88.5 | 82.6 | 77.9 | 65.7 |
| $LiMn_2O_4$ (15 μm) + $LiNi_{0.8}Mn_{0.1}Co_{0.1}O_2$ (6 μm) | Th** | 100.0 | 98.5 | 96.6 | 95.2 | 92.9 | 89.1 | 82.2 |
| | | 100.0 | 99.3 | 98.2 | 96.9 | 94.1 | 85.7 | 72.6 |
| $LiMn_2O_4$ (15 μm) + $LiNi_{1/3}Mn_{1/3}Co_{1/3}O_2$ (5 μm) | Ob | 100.0 | 98.9 | 97.4 | 96.0 | 94.0 | 89.0 | 83.3 |
| | Th | 100.0 | 99.5 | 98.6 | 97.4 | 94.5 | 86.0 | 73.5 |
| $LiNi_{0.7}Mn_{0.05}Co_{0.25}O_2$ (12 μm) + $LiNi_{0.8}Co_{0.2}O_2$ (6 μm) | Ob | 100.0 | 97.1 | 92.3 | 87.5 | 83.4 | 81.2 | 70.4 |
| | Th | 100.0 | 97.1 | 92.7 | 88.9 | 84.9 | 81.0 | 70.0 |
| $LiNi_{0.425}Mn_{0.425}Co_{0.15}O_2$ (6 μm) + $LiNi_{0.45}Mn_{0.45}Co_{0.1}O_2$ (6 μm) | Ob | 100.0 | 97.3 | 92.4 | 87.9 | 81.5 | 76.1 | 62.9 |
| | Th | 100.0 | 97.5 | 92.9 | 88.4 | 82.4 | 77.4 | 65.0 |
| $LiNi_{0.425}Mn_{0.425}Co_{0.15}O_2$ (6 μm) + $LiNi_{0.5}Mn_{0.5}O_2$ (6 μm) | Ob | 100.0 | 96.6 | 91.2 | 86.0 | 78.5 | 72.4 | 59.7 |
| | Th | 100.0 | 97.3 | 92.6 | 87.2 | 80.7 | 74.1 | 61.1 |

Note
Ob*: Observed value
Th**: Theoretical value

As can be seen from Table 2, it was confirmed that cells of Examples 16 and 17 in which cathodes were formed of active materials having different redox levels to each other exhibited the observed values greater than the theoretical values at more than 3.0 C rate and in particular, a higher discharge rate leads to increases in such a deviation and 5.0 C rate leads to occurrence of considerable deviation.

In contrast, it was also confirmed that even though the cathode of the cell was formed of active materials having different redox levels, there were substantially no increases or even decreases in the observed values as compared to the theoretical values when the redox potential difference between active materials was not large as shown in FIGS. 15 and 16 (Comparative Examples 22 through 24).

In conclusion, it is difficult to achieve desired effects of the present invention by simply mixing heterogeneous active materials and therefore it can be seen that such combinations of heterogeneous active materials can provide desired effects when active materials have the redox potential difference meeting conditions specified in the present invention.

INDUSTRIAL APPLICABILITY

As apparent from the above description, in accordance with the present invention, when a mixture of two or more active materials having different redox potentials to each other is used as a cathode active material and preferably the active materials have different particle diameters, it is possible to prepare a lithium secondary battery having improved discharge characteristics in a range of high-rate discharge while minimizing a dead volume, and at the same time, having increased cell capacity via increased electrode density and electrode loading amounts.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cathode active material for a lithium secondary battery, comprising:
a first active material; and
a second active material,
wherein the first and the second active materials have different redox levels,
wherein a redox potential difference between the redox levels of the first and the second active materials ranges from 0.29 V to 1.0 V,
wherein an average particle diameter of the first active material is less than 50% of an average particle diameter of the second active material,
wherein the average particle diameter of the first active material ranges from 12 μm to 15μm,
wherein the first active material is contained in an amount of 15 percent to 35percent by weight, based on the total weight of the cathode active material, and
wherein the first active material is $LiNi_{1/3}Mn_{1/3}Co_{1/3}O_2$, and wherein the second active materials is represented by Formula IV:

$$Li_{1+x}Mn_{2-y}M_yO_4A_a \quad (IV)$$

wherein $-0.2<x<0.2$; $0\leq y\leq 0.4$; $0<a<0.05$; M is a first row transition metal selected from the group consisting of Ni, Mn, Fe, Cr, Ti, Zn, V, Al, and Mg; and A is an element of Group 6A or Group 7A selected from the group consisting of S, Se, F, Cl and I; and
wherein the materials of Formula IV are active materials having electrochemical characteristics of $Mn^{3+} \leftrightarrow Mn^{4+}$ oxidation-reduction in spinel structures thereof.

2. The cathode active material according to claim 1, wherein the redox level of the first and the second active materials is in the range of 3.5 to 4.5V.

3. The cathode active material according to claim 1, wherein the average particle diameter of the first active material is in the range of 10 to 35% of an average particle diameter of the second active material.

4. The cathode active material according to claim 1, wherein the content of the first active material is in the range of 20 to 35% by weight, based on the total weight of the cathode active material.

5. The cathode active material accordingly to claim 1, wherein M in Formula IV is Al.

6. The cathode active material according to claim 1, wherein a redox potential difference between the redox levels of the first and the second active materials ranges from 0.32 V to 1.0 V.

* * * * *